US007612996B2

(12) United States Patent
Atkins et al.

(10) Patent No.: US 7,612,996 B2
(45) Date of Patent: Nov. 3, 2009

(54) TEMPERATURE CONTROL DEVICE, DISK DRIVE UNIT TEST APPARATUS, AND A METHOD OF TESTING OR OPERATING A PLURALITY OF DISK DRIVE UNITS

(75) Inventors: Andrew William Atkins, Southampton (GB); David Ronald Bain Farquhar, West Sussex (GB)

(73) Assignee: Xyratex Technology Limited, Havant, Hampshire (GB)

( * ) Notice: Subject to any disclaimer, the term of this patent is extended or adjusted under 35 U.S.C. 154(b) by 437 days.

(21) Appl. No.: 10/567,378

(22) PCT Filed: Sep. 7, 2004

(86) PCT No.: PCT/GB2004/003802

§ 371 (c)(1),
(2), (4) Date: Jul. 21, 2006

(87) PCT Pub. No.: WO2005/024831

PCT Pub. Date: Mar. 17, 2005

(65) Prior Publication Data

US 2007/0034368 A1 Feb. 15, 2007

Related U.S. Application Data

(60) Provisional application No. 60/500,676, filed on Sep. 8, 2003.

(51) Int. Cl.
*H05K 7/20* (2006.01)
(52) U.S. Cl. .................. 361/679.51; 361/679.33; 361/679.49; 454/184

(58) Field of Classification Search ............... 361/690, 361/695, 679.33, 679.47, 679.48, 679.51; 360/97.02; 454/184; 312/223.1, 223.2; 415/182.1, 415/206
See application file for complete search history.

(56) References Cited

U.S. PATENT DOCUMENTS 4,642,715 A    2/1987   Ende
5,307,222 A *  4/1994   Dion ................... 360/97.02

(Continued)

FOREIGN PATENT DOCUMENTS

WO    WO 01/41148 A1    6/2001

(Continued)

OTHER PUBLICATIONS

International Search Report for Application No. PCT/GB2004/003802.

*Primary Examiner*—Jayprakash N Gandhi
*Assistant Examiner*—Courtney Smith
(74) *Attorney, Agent, or Firm*—Pillsbury Winthrop Shaw Pittman, LLP

(57) ABSTRACT

The invention provides a temperature control device for a disk drive unit, the temperature control device includes a housing for connection to a carrier for a disk drive unit; an air flow generator arranged in the housing for providing a flow of air to a disk drive unit in a connected carrier; and, an air flow control device arranged at the side of the air flow generator and selectively configurable to control the air flow path whereby the temperature of air flowing to the disk drive unit can be controlled.

14 Claims, 5 Drawing Sheets

U.S. PATENT DOCUMENTS

| | | | | |
|---|---|---|---|---|
| 5,414,591 | A * | 5/1995 | Kimura et al. | 361/695 |
| 5,484,012 | A | 1/1996 | Hiratsuka | |
| 5,694,290 | A * | 12/1997 | Chang | 361/685 |
| 6,991,533 | B2 * | 1/2006 | Tsai et al. | 454/184 |
| 7,046,470 | B2 * | 5/2006 | Yamanashi et al. | 360/69 |
| 7,345,873 | B2 * | 3/2008 | Dey et al. | 361/695 |
| 2001/0006453 | A1 | 7/2001 | Glorioso et al. | |
| 2001/0046118 | A1 | 11/2001 | Yamanashi et al. | |
| 2004/0212920 | A1 * | 10/2004 | Tadepalli et al. | 360/97.02 |
| 2005/0219809 | A1 * | 10/2005 | Muncaster et al. | 361/685 |
| 2006/0232930 | A1 * | 10/2006 | Artman et al. | 361/695 |
| 2007/0195497 | A1 * | 8/2007 | Atkins | 361/685 |
| 2007/0253157 | A1 * | 11/2007 | Atkins et al. | 361/685 |
| 2008/0100957 | A1 * | 5/2008 | Gross et al. | 360/97.02 |
| 2008/0117590 | A1 * | 5/2008 | Dey et al. | 361/687 |

FOREIGN PATENT DOCUMENTS

WO    WO 2004/006260 A1    1/2004

* cited by examiner

TEMPERATURE CONTROL DEVICE, DISK DRIVE UNIT TEST APPARATUS, AND A METHOD OF TESTING OR OPERATING A PLURALITY OF DISK DRIVE UNITS

CROSS REFERENCE TO RELATED APPLICATIONS

This is the U.S. National Phase of PCT/GB04/003802, filed Sep. 7, 2004, which in turn claims priority to U.S. Provisional Patent Application No. 60/500,676, filed Sep. 8, 2003, both of which are incorporated herein in their entirety by reference.

The present invention relates to a temperature control device, a disk drive unit test apparatus and a method of testing or operating a plurality of disk drive units During manufacture of disk drive units, it is necessary to test the disk drive units to ensure that they meet the required specification. As part of the testing operation, it is necessary to control the temperature of the disk drive units. The temperature of the disk drive units is varied across a wide range during testing. In one of the applicant's own known testing apparatus, the temperature of plural disk drive units is controlled by using cooling or heating air which is common to all of the disk drive units.

It is also desirable to maintain the temperature of a disk drive unit to be within a predetermined range during normal operation of the disk drive unit, i.e. when the disk drive unit is in normal use by an end user. It is common practice in computers to provide a cooling fan which draws in air and causes the cooling air to flow over components within the computer including particularly the CPU, in order to keep down the temperature of the components. However, this provides a crude cooling mechanism and does not provide for separate control of the temperature of the individual components of the computer and particularly the disk drive unit. A temperature control device is required that enables the temperature of a disk drive to be controlled.

There is disclosed in the applicant's own international patent application number WO-A-01/41148 a system for temperature control of a disk drive unit. Reference is also made to our PCT/GB03/02826.

In systems in which plural disk drive units are connected together such as, for example, test racks, it is desirable to be able to fit as many temperature control devices and disk drive units into a limited volume as possible.

According to a first aspect of the present invention, there is provided a temperature control device for a disk drive unit, the temperature control device comprising: a housing for connection to a carrier for a disk drive unit; an air flow generator arranged in the housing for providing a flow of air to a disk drive unit in a connected carrier; and, an air flow control device arranged at the side of the air flow generator and selectively configurable to control the air flow path whereby the temperature of air flowing to the disk drive unit can be controlled.

According to a second aspect of the present invention, there is provided disk drive unit test apparatus for receiving a plurality of disk drive units, the test apparatus comprising: a plurality of temperature control devices according to the first aspect of the present invention and a plurality of carriers, each for connection to a respective one of the temperature control devices and each for receiving a respective disk drive unit.

According to a third aspect of the present invention, there is provided a method of testing one or more disk drive units, wherein the temperature of each of the one or more disk drive units is independently controlled during testing of the disk drive units, the temperature being controlled using a temperature control device according to the first aspect of the present invention.

According to a fourth aspect of the present invention, there is provided a method of operating one or more disk drive units, wherein the temperature of each of the one or more disk drive units is independently controlled during operation of the disk drive units, the temperature being controlled using a temperature control device according to the first aspect of the present invention.

The temperature control device enables the temperature of a disk drive unit to be controlled to be at a predetermined temperature during operation of the disk drive unit. It will be understood that, in practice, the temperature will be controlled to be within certain limits of a predetermined temperature and the phrase "predetermined temperature" shall be construed accordingly. Since the air flow control device is arranged at the side of the fan within the temperature control device, the volume (principally the height) occupied by the temperature control device is smaller in comparison to previously available temperature control devices. Accordingly, the invention provides a solution to the problem of providing a temperature control device with which the temperature of a disk drive unit can be controlled independently of any other associated disk drive units whilst simultaneously minimising the volume required for the temperature control device.

An embodiment of the present invention will now be described by way of example with reference to the accompanying drawings, in which.

Figure 1:
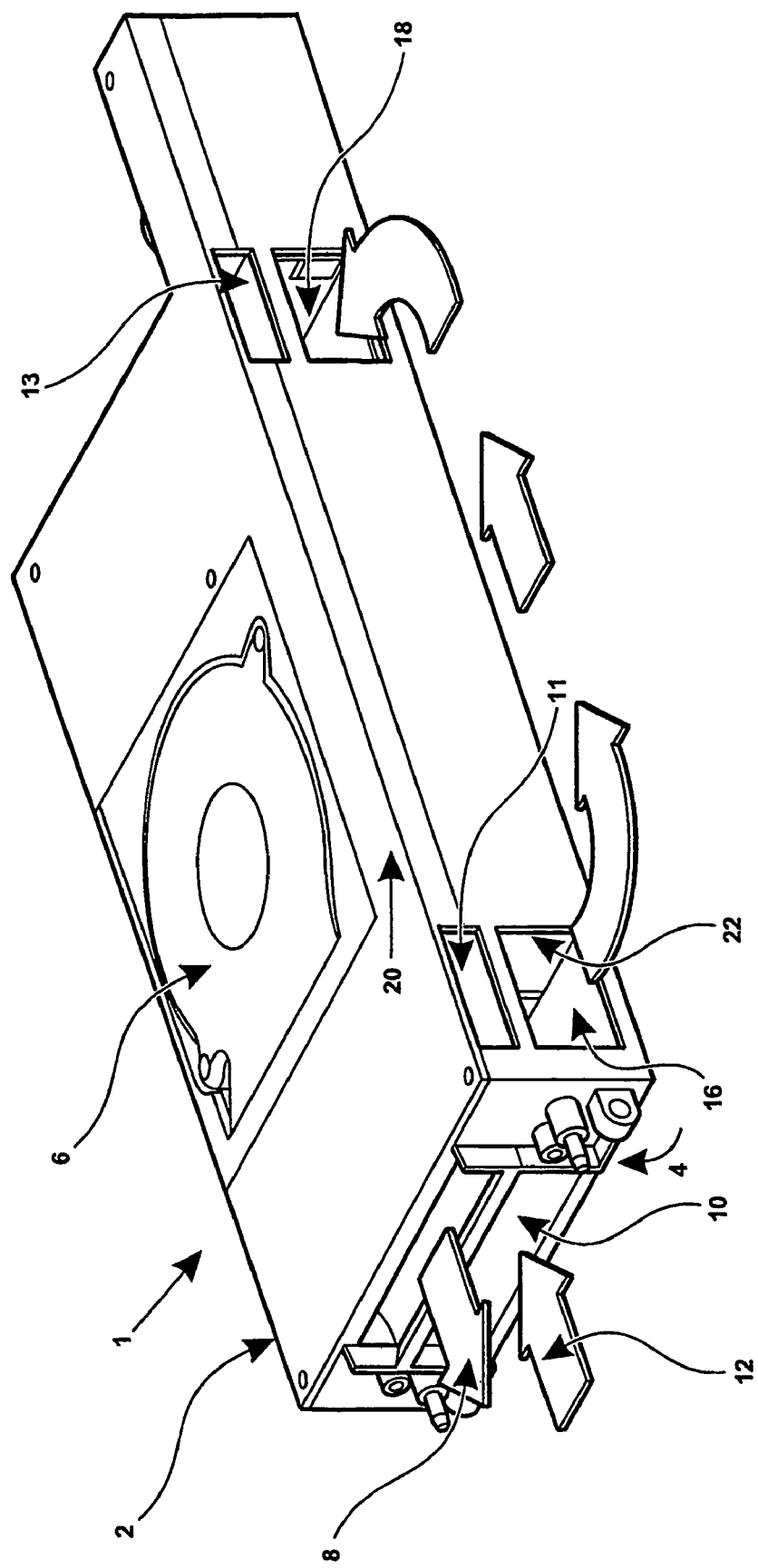
FIG. 1 shows a perspective view of an example of a temperature control device according to an embodiment of the present invention.

FIG. 1 shows an example of a temperature control device 1 for a disk drive unit according to an embodiment of the present invention. In the example shown, a housing 2 is provided with a connector 4 to connect the temperature control device 1 to a tray holding a disk drive unit (not shown). The temperature control device 1 includes an air flow generator, such as a fan 6, which is arranged to provide a flow 8 of air in the direction of the disk drive unit. The temperature control device 1 is also provided with an inlet 10 to receive a flow 12 of air from the disk drive unit.

The temperature control device 1 is controllable to direct the returning air flow 12 via a selected route such that once it is received again by the fan 6 it is at a desired temperature to provide either cooling or heating to the disk drive unit. To achieve this, the temperature control device 1 is provided with an air flow control device 22, which is selectively configurable in such a way that the air flow path can be controlled. Accordingly, the temperature of air provided by the fan 6 to the disk drive can be controlled. Apertures 16 and 18 are provided in a side wall of the housing 2, one at the front end of the housing 2, and the other at the rear end of the housing 2.

As will be explained below, apertures 16 and 18 serve to provide a route for air via a heat exchanger (not shown in FIG. 1). The function of the heat exchanger could simply be provided by a vent to the outside atmosphere. In this case to provide a cooling function it would be necessary for the outside atmosphere to be at a lower temperature than the disk drive unit. The apertures 16 and 18 form part of a sub-system 20 including a valve 22 used to control the flow of air and in particular the direction of the flow of air so that it can be controlled to flow either through the heat exchanger where it can be cooled down or to flow directly to the disk drive unit so no cooling of the air is provided.

The housing 2 is also provided with openings 11 and 13 which provide a path for air from the heat exchanger used to cool associated electronics such as a control board (not shown) for the temperature control device 1.

Figure 2:
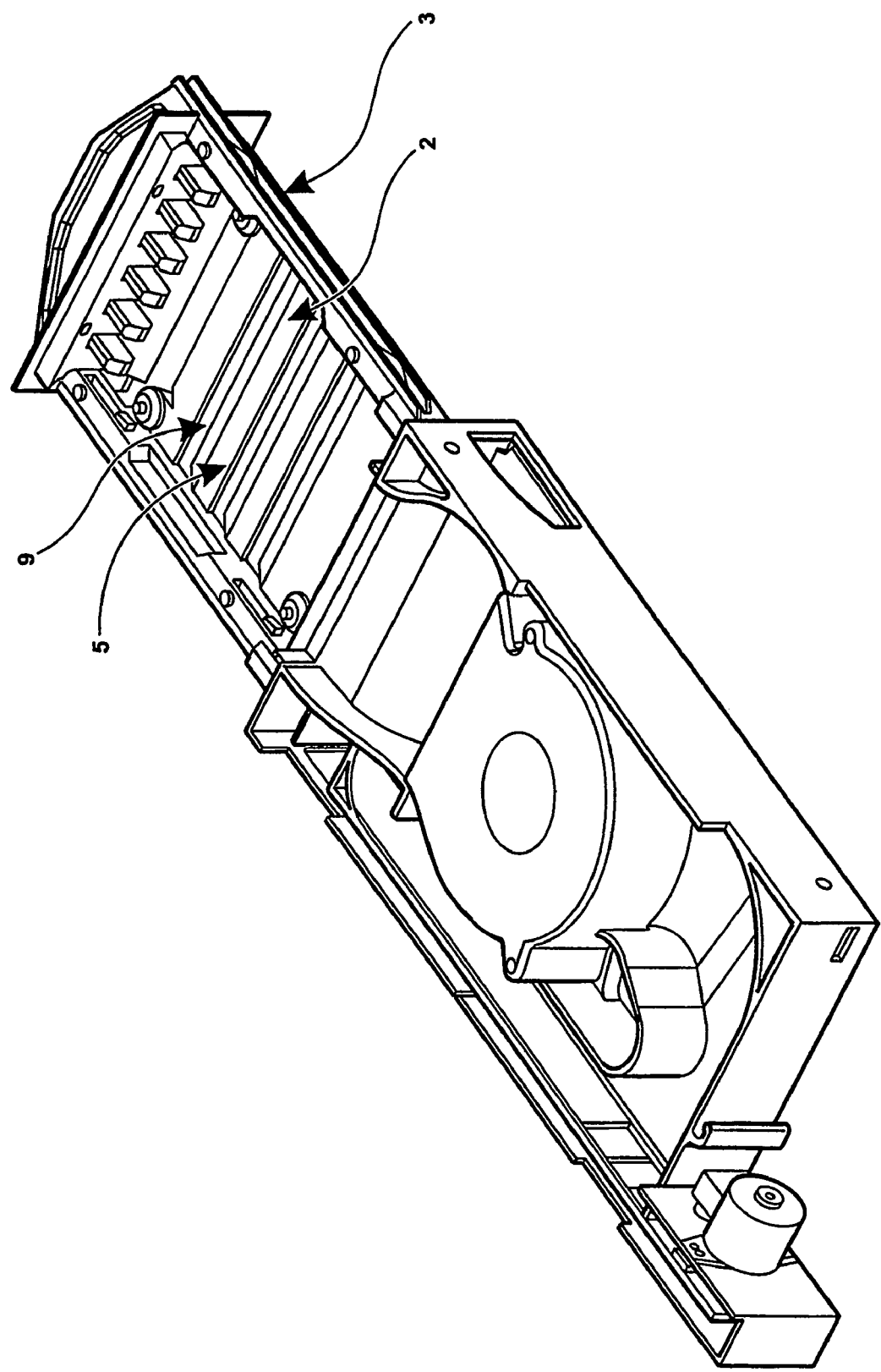
FIG. 2 is a view showing a perspective view of an example of temperature control devices as shown in FIG. 1, having a tray connected to it suitable for receiving a disk drive.

FIG. 2 is a perspective view of an example of a temperature control device 1 as shown in FIG. 1, having a tray 3 connected to it suitable for receiving a disk drive unit. The tray 3 may be of the type disclosed in our copending International patent application (agent's ref. AF2/P9716WO) of even date herewith, the entire content of which is hereby incorporated by reference. The component parts of the temperature control device 1 will be described below with reference to FIGS. 3 and 4. Referring to FIG. 2, the tray 3 is provided with a space 5 into which a disk drive unit shown schematically in phantom can be inserted. The tray 3 has a bottom surface 7 provided with a number of openings 9 which enable circulation of air around the inserted disk drive unit. As will be explained below, the air is provided by the temperature control device.

Figure 3:
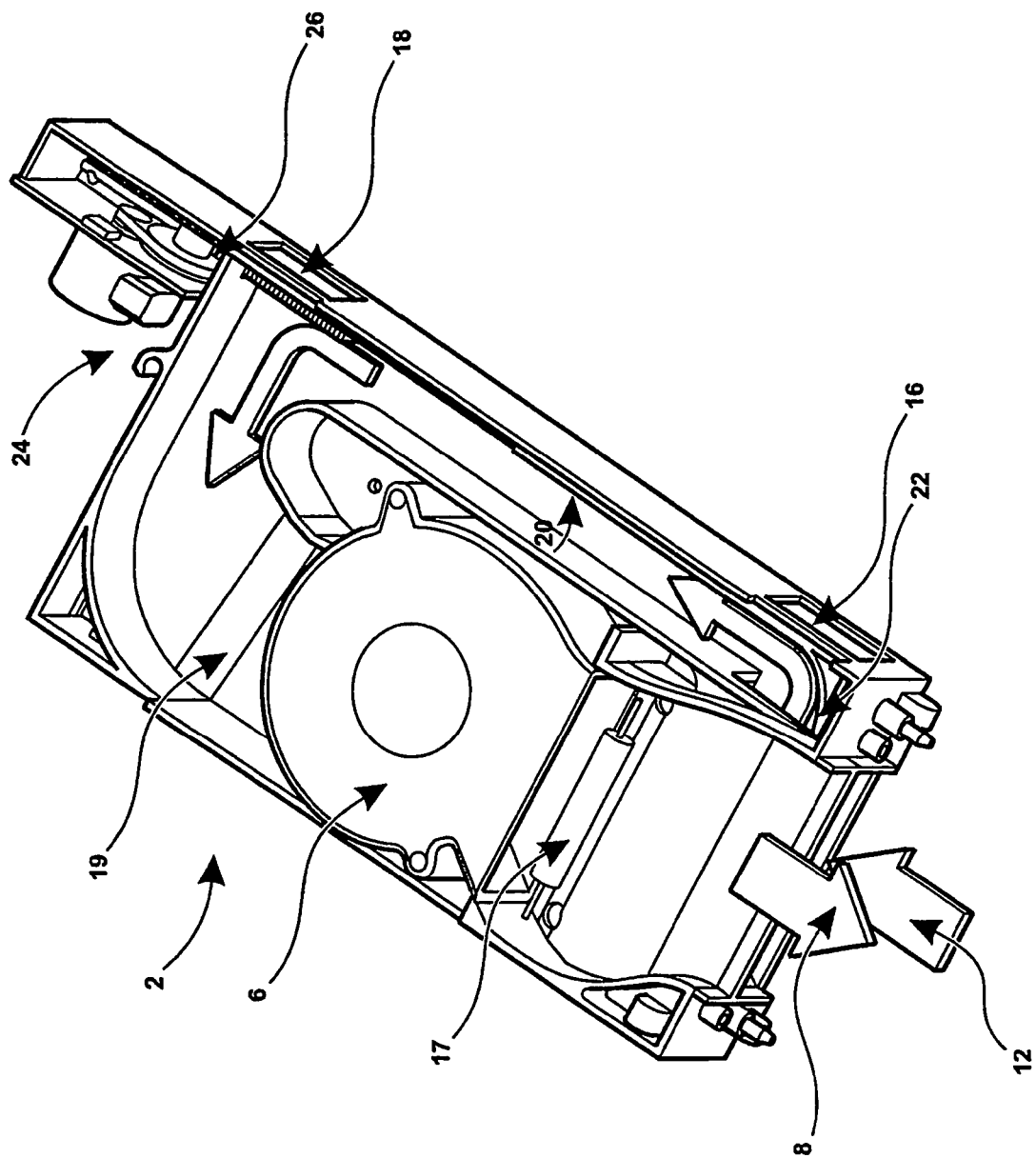
FIG. 3 is a view from above of the temperature control device of FIG. 1 in a selected configuration.

FIG. 3 shows a plan view of the temperature control device with the top removed. As in FIG. 1, a fan 6 can be seen which functions to provide the flows 8 and 12 of air substantially parallel to a longitudinal axis of the temperature control device. Sub-system 20 can be seen to include a linear air track at one side of the fan 6. The valve 22, also linear in this example, is operative to control the degree or amount of opening of apertures 16 and 18. A motor 24 is provided to control the position of valve 22 and consequently the degree of opening of apertures 16 and 18. In the example shown a rack and pinion mechanism 26 is provided to control movement of the valve 22, although any suitable mechanism could be used.

Air returning in air flow 12 is therefore directed by the sub-system 20 either directly back to the fan 6, or via the heat exchanger or a mixture of the two. Air is received by the fan 6 through an opening (not shown) in its housing, typically provided underneath the fan. In the example shown in FIG. 2, a ramp 19 is provided and serves to provide a route for the air under and into the fan 6.

In the configuration shown in FIG. 3, the sub-system 20 is arranged such that the member 22 is positioned to close apertures 16 and 18. Air flow 12 returning from the disk drive unit is directed by a curved end of the valve 22 to flow by the side of fan 6 and is directly recirculated by the fan into the air flow 8. Since the disk drive unit (not shown in FIG. 3) to which the temperature control device is connected generates heat in use, simply recycling air from the disk drive unit via fan 6 has the effect of increasing the temperature of the air and the disk drive unit accordingly.

The valve 22 can be moved in the direction of the motor 24 such that the apertures 16 and 18 can be partially or fully opened to enable air to flow out through aperture 16 and from there into a heat exchanger. The heat exchanger then cools the air and provides a flow of cooled air through aperture 18 in the direction of the fan 6. Such a configuration of the valve 22 and temperature control device is shown in FIG. 4.

Figure 4:
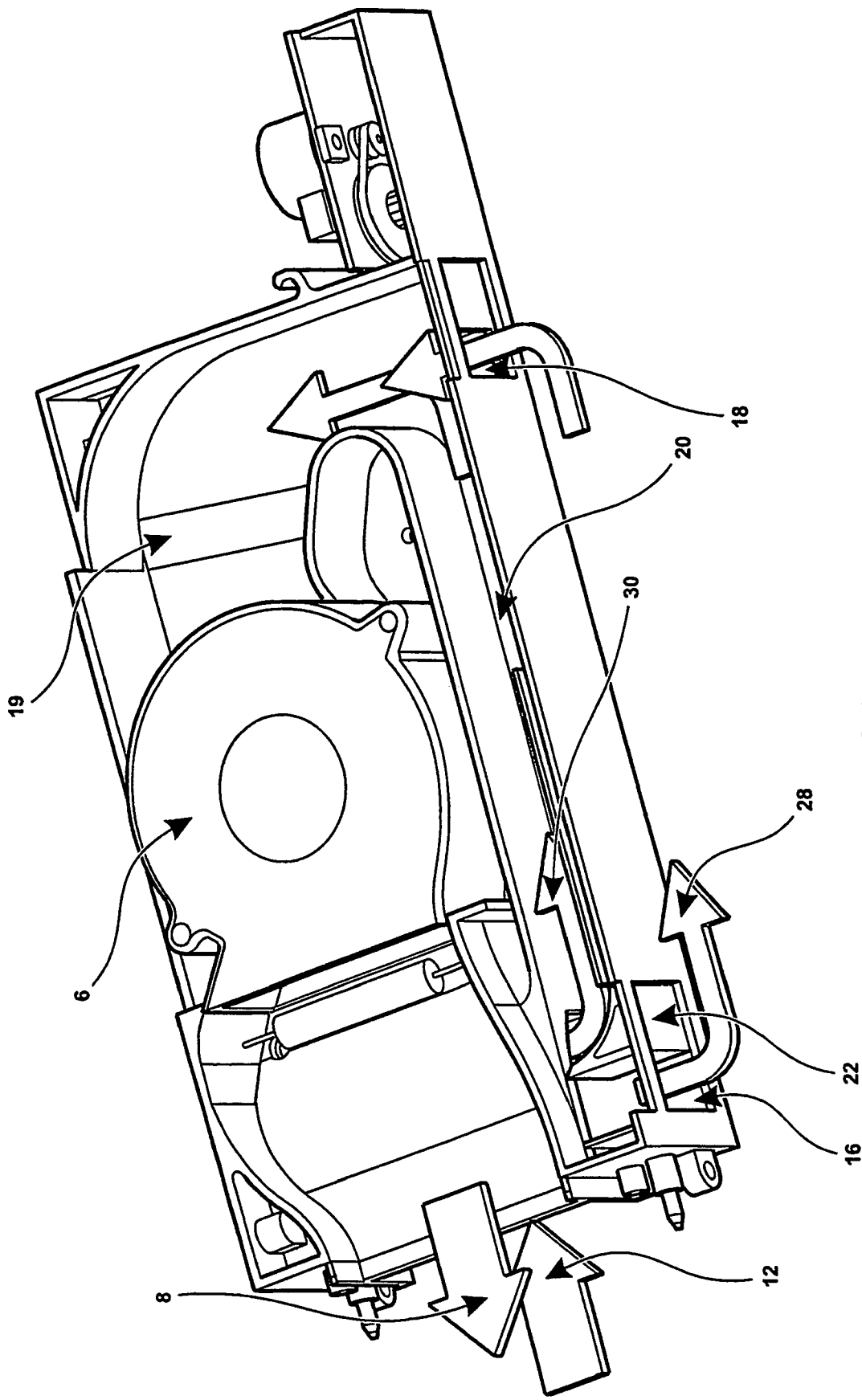
FIG. 4 is a view from above of the temperature control device of FIG. 1 in a different selected configuration; and, FIG. 5 is a perspective view of a composite disk drive unit test unit.

FIG. 4 shows a view from above of the temperature control device. In the configuration in FIG. 4, the valve 22 is in an intermediate position such that apertures 16 and 18 are each partially open and partially closed. It can be seen that returning air flow 12 is split by valve 22 into two component air flows 28 and 30. Air flow 28 is directed to the heat exchanger whereas air flow 30 is directed directly back to the fan 6. It will be appreciated that apertures 16 and 18 can be open or closed by any desired amount such that the relative proportion of air flow 12 that is cooled and that which is not cooled but rather directly recirculated, can be controlled.

In all the examples shown, the air valve 22 functions as an air flow control device and is arranged at the side of the fan. In other words, the valve 22 is substantially on the same level as the fan i.e. at the level of the housing. As air flows from the disk drive unit and is returned via sub-system 20 to the fan, at all times it is substantially at the level of the housing 2 of the temperature control device. This enables the volume (principally the height) of the temperature control device to be minimised since there is no need to direct air onto different levels as done in conventional systems.

As will be appreciated, when air is caused simply to recirculate around the disk drive as in the configuration shown in FIG. 3, the temperature of the disk drive will rise. This provides for rapid heating of the disk drive unit. This is particularly advantageous when testing of the disk drive unit at higher temperatures is required as it allows those higher temperatures to be achieved more quickly, allowing for a fast through put of disk drive units during testing. In a preferred embodiment shown in FIGS. 1 to 4, an electric heater 17 is provided in the air flow path from the outlet of the fan 6 to the disk drive unit. The electric heater 17 is selectively operated to heat the air, thereby to achieve more rapid warming of the disk drive unit if required.

When the temperature control device is operating in a chilled air mode shown in FIG. 1, chilled air is caused to flow over the disk drive unit, thereby cooling the disk drive unit as necessary. Use of chilled air allows more rapid cooling of the disk drive unit to be achieved.

By appropriate positioning of the valve 22 between the extreme positions shown in FIGS. 1 and 3, a mix of chilled air and directly recirculated air can be caused to flow across the disk drive unit, the mix being in any desired proportion. The valve 22 and more generally the sub-system 20 can therefore be configured to achieve and maintain the temperature of the disk drive unit at a predetermined level.

Figure 5:
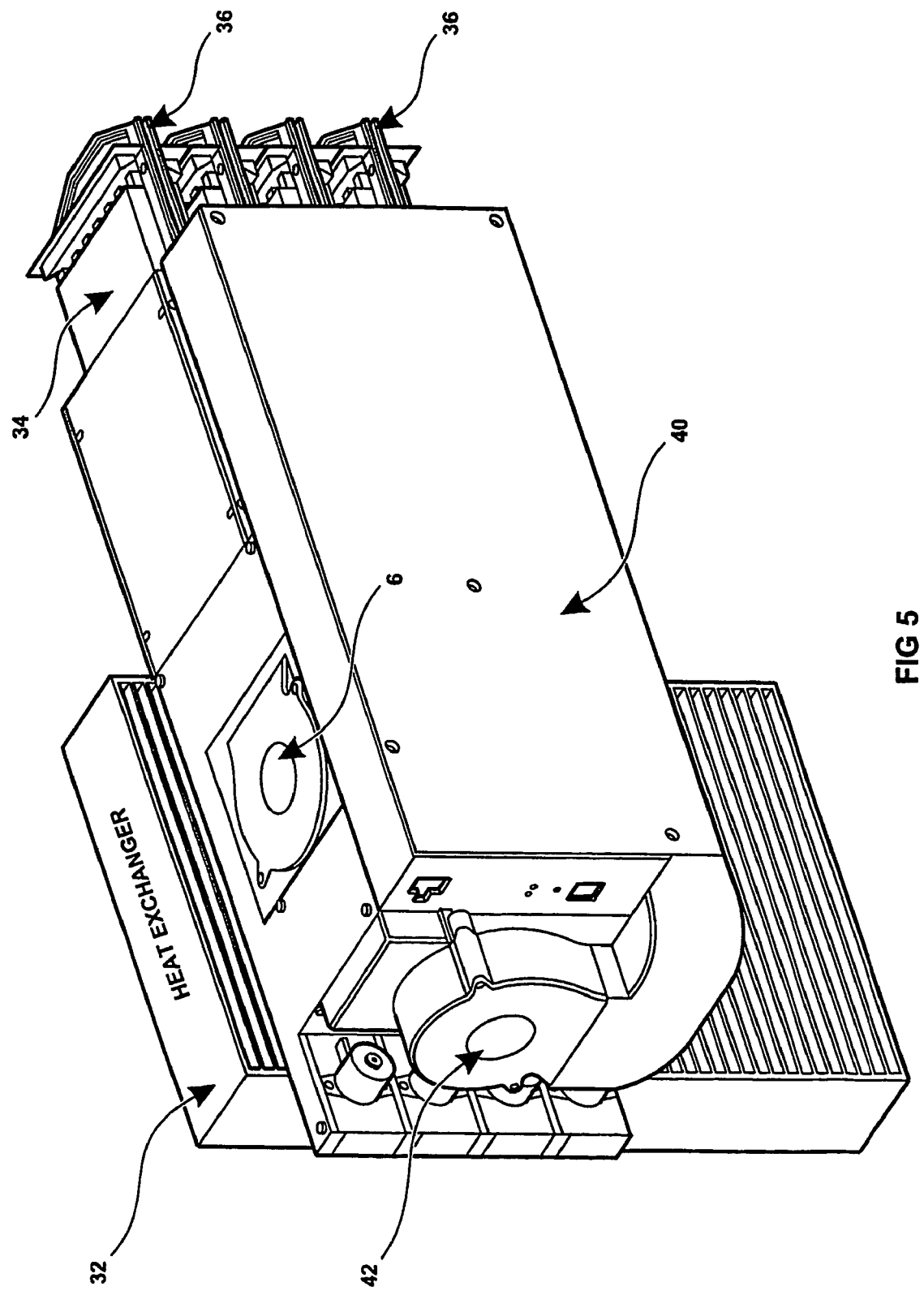

FIG. 5 shows a composite unit of four temperature control devices connected to a common heat exchanger 32 at one side of carriers 36. In the example shown, the fan 6 of the top temperature control device in the system can be seen as can the disk drive units 34 arranged in carriers 36. By arranging the air flow control device at the side of the fan 6 in each of the temperature control devices, the volume of each temperature control device can be reduced such that the overall volume of the composite system shown in FIG. 5 can be correspondingly reduced. A housing 40 is provided adjacent to the carriers 36 for containing the electronics referred to above. An air flow generator 42, in this example, at the back of the carriers 36, is also provided to generate air flow between the electronics contained in housing 40 and the heat exchanger 32.

Each of the temperature control devices described above can be used to control the temperature of a disk drive unit during testing of the disk drive unit as part of the normal manufacturing process of the disk drive unit. Each of the temperature control devices can also be used to control the temperature of the disk drive unit during normal operation of the disk drive unit by an end user.

A plurality of temperature control devices can be incorporated in or assembled into disk drive unit test apparatus, such as for example a test rack. In this way, plural disk drive units can be tested independently of each other with independent control of the temperature of each of the disk drive units taking place. This allows individual disk drive units to be moved into and out of the test apparatus without affecting the testing of other disk drive units in the apparatus. The temperature of individual disk drive units in the test apparatus can be markedly different from the temperature of other disk drive units in the apparatus. The temperature of each of the disk drive units can be controlled to be at a predetermined level, which may or may not be the same for all of the disk drive units, regardless of the power consumption of the individual disk drive units and local conditions at each disk drive unit.

In addition to use in controlling the temperature of disk drive units during testing, each of the temperature control devices described above can be used to control the temperature of a disk drive unit when used by an end user as a data storage product. Similarly, plural temperature control devices can be incorporated in or assembled together to form data storage apparatus having plural disk drive units which may be independently operable, the temperature of each of which can be independently controlled. The temperature control devices can be mass manufactured at relatively low cost. The temperature control device is effectively modular in that multiple temperature control devices can be built up together without affecting the operation of other such devices.

In a particular example, the temperature of a disk drive can be controlled to be in plus or minus 1 degree centigrade of the target temperature in the range of about 20° C. to 70° C. The maximum rate of increase of temperature which is achievable can typically be of the order of 4-7° C. per minute and the minimum rate of decrease of temperature can typically be of the order of 1-3° C. per minute.

An embodiment of the present invention has been described with particular reference to the example illustrated. However, it will be appreciated that variations and modifications may be made to the example described within the scope of the present invention.

The invention claimed is:

1. A temperature control device for a disk drive unit, the temperature control device comprising:
 a housing for connection to a carrier for a disk drive unit;
 an air flow generator arranged in the housing for providing a flow of air to a disk drive unit in a connected carrier; and,
 an air flow control device arranged at the side of the air flow generator and selectively configurable to control the air flow path whereby the temperature of air flowing to the disk drive unit can be controlled in which the air flow control device is provided at the same vertical level within the temperature control device as the air flow generator, the air flow control device being substantially planar and slidable to vary the degree of opening of apertures within a side of the housing of the temperature control device.

2. The temperature control device according to claim 1, comprising at least two apertures in a side of the housing for providing possible air flow paths.

3. The temperature control device according to claim 2, in which the air flow control device comprises a linearly movable valve to control a degree of opening of the apertures.

4. The temperature control device according to claim 3, comprising a rack and pinion mechanism to operate the linearly movable valve.

5. The temperature control device according to claim 2, comprising a heat exchanger in communication with the apertures arranged to selectively receive and cool at least a portion of the air from a said disk drive unit thereby to provide chilled air, wherein the air flow control device is selectively operable to cause air to recirculate directly across a said disk drive unit, or to cause at least a portion of the air that has passed over a said disk drive unit to pass through the heat exchanger.

6. The temperature control device according to claim 3, comprising a heat exchanger in communication with the apertures arranged to selectively receive and cool at least a portion of the air from a said disk drive unit thereby to provide chilled air, wherein the air flow control device is selectively operable to cause air to recirculate directly across a said disk drive unit, or to cause at least a portion of the air that has passed over a said disk drive unit to pass through the heat exchanger.

7. The temperature control device according to claim 4, comprising a heat exchanger in communication with the apertures arranged to selectively receive and cool at least a portion of the air from a said disk drive unit thereby to provide chilled air, wherein the air flow control device is selectively operable to cause air to recirculate directly across a said disk drive unit, or to cause at least a portion of the air that has passed over a said disk drive unit to pass through the heat exchanger.

8. The temperature control device according to claim 5, wherein the first and second apertures are capable of being open or closed in a desired proportion such that air provided to a said disk drive unit is a mixture of directly recirculated air and air from the heat exchanger.

9. The temperature control device according to claim 1, comprising a selectively operable heater in the air flow path to a said disk drive unit for selectively heating air prior to said air flowing across a said disk drive unit.

10. The temperature control device according to claim 1, wherein the air flow generator is a DC blower or a radial fan.

11. Disk drive unit test apparatus for receiving a plurality of disk drive units, the test apparatus comprising:
 a plurality of temperature control devices according to claims 1; and,
 a plurality of caters, each for connection to a respective one of the temperature control devices and each for receiving a respective disk drive unit.

12. A method of testing one or more disk drive units, wherein the temperature of each of the one or more disk drive units is independently controlled during testing of the disk drive units, the temperature being controlled using the temperature control device according to claim 1.

13. A method of operating one or more disk drive units, wherein the temperature of each of the one or more disk drive units is independently controlled during operation of the disk drive units, the temperature being controlled using the temperature control device according to claim 1.

14. The temperature control device according to claim 2, in which the air flow control device comprises a substantially planar slidable valve movable to vary the open area of the apertures.

* * * * *

UNITED STATES PATENT AND TRADEMARK OFFICE
CERTIFICATE OF CORRECTION

PATENT NO. : 7,612,996 B2  Page 1 of 1
APPLICATION NO. : 10/567378
DATED : November 3, 2009
INVENTOR(S) : Andrew William Atkins et al.

It is certified that error appears in the above-identified patent and that said Letters Patent is hereby corrected as shown below:

Col. 6, line 43
replace "a plurality of caters, each for connection to a respective one"
with --a plurality of carriers, each for connection to a respective one--.

Signed and Sealed this

Sixteenth Day of November, 2010

David J. Kappos
*Director of the United States Patent and Trademark Office*